A. L. BURGER.
HAT PIN GUARD.
APPLICATION FILED MAY 14, 1913.
1,082,067.
Patented Dec. 23, 1913.
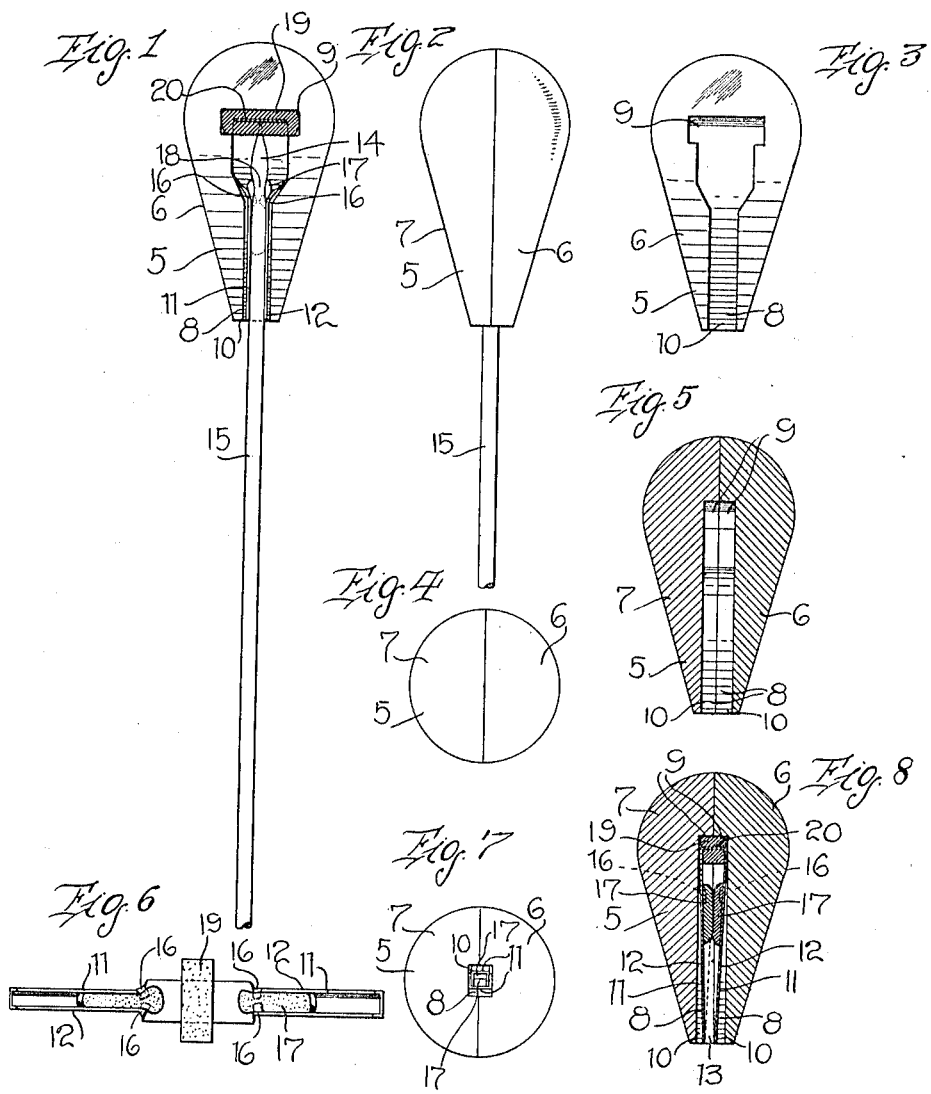
Witnesses
Robert M. Sutphen.
A. I. Hind.
Inventor
A. L. Burger
By Watson E. Coleman
Attorney

UNITED STATES PATENT OFFICE.

ARCHIBALD L. BURGER, OF ONO, CALIFORNIA.

HAT-PIN GUARD.

1,082,067.

Specification of Letters Patent.  Patented Dec. 23, 1913.

Application filed May 14, 1913.  Serial No. 767,614.

*To all whom it may concern:*

Be it known that I, ARCHIBALD L. BURGER, a citizen of the United States, residing at Ono, in the county of Shasta and State of California, have invented certain new and useful Improvements in Hat-Pin Guards, of which the following is a specification, reference being had to the accompanying drawings.

This invention relates to improvements in hat pin guards, and an object thereof is the provision of a guard which is adapted to be mounted upon the pointed end of a hat pin to prevent accidental withdrawal of the pin from the hat, and also to protect the point of the pin and prevent the same from injuring persons adjacent the wearer thereof.

Another object of this invention is the provision of a hat pin which is formed near its pointed end with an annular groove, the guard being provided with means to engage in the groove to lock the pointed end of the pin within the guard and thereby prevent accidental displacement of the pin from the hat.

With these and other objects in view, my invention consists in certain novel constructions, combinations, and arrangements of parts, to be hereinafter more fully described, claimed and illustrated in the accompanying drawing, in which—

Figure 1 is an elevation of my device with one section of the head removed; Fig. 2 is an elevation thereof showing the sections connected; Fig. 3 is an elevation of the inner face of one of the sections of the head; Fig. 4 is an end view; Fig. 5 is a longitudinal section with the spring member removed; Fig. 6 is a plan view of the spring member showing the arms in extended position; Fig. 7 is an inner end view of the head; and Fig. 8 is a longitudinal section thereof showing the spring member in position.

Referring more particularly to the drawing, the numeral 5 designates generally my improved hat pin guard which may be of any desired size and configuration, the guard comprising a head which is formed of two sections 6 and 7, the opposing faces of which are flat. The sections of the guard may be secured together by any suitable means such as solder or the like, and the opposing face of each section is provided with a central longitudinal groove 8, the inner end of which is enlarged transversely as at 9, and the outer end being reduced as at 10, the grooves when the sections are connected co-acting to form a seat for the reception of a spring member 11. The spring member 11 comprises a plate of spring metal which is bent upon itself to form a pair of spring arms 12 which are curved to co-act with one another to form a bore 13 which is adapted to receive the pointed end 14 of a hat pin 15. The arms 12 are formed inwardly of the bore with inwardly projecting lugs 16 which secure rubber grips 17 to the arms, the grips being adapted to engage in an annular groove 18 formed inwardly of the pointed end of the pin. A block or buffer 19 having an elongated slot 20 is connected to the medial portion of the spring member 11 to surround the same, the block being composed of rubber or other suitable yieldable material.

In the practical use of my device, the outer ends of the arm 12 lie flush with the outer end of the guard, and the hat pin point is inserted in the bore 13 of the spring member, so that the rubber grips 17 engage the annular groove 18 in the pin to secure the point of the pin in the guard. The point of the pin is adapted to enter into the rubber buffer 19 whereby the point of the pin is prevented from becoming blunted.

From the above description taken in connection with the accompanying drawing, it will be seen that I have provided a simple hat pin guard which will protect the point of the pin and prevent the same from becoming disengaged from the hat, the guard being efficient in use and one which will fulfil all of the requirements of such a device.

Having thus fully described my invention what I desire to claim and secure by Letters Patent is:

1. A device of the character described comprising a sectional head having a seat therein, a spring member mounted in said seat, said spring member comprising a plate bent upon itself to form spring arms, the outer ends of said arms being curved, the curved portions of said arms coöperating to form a bore, inwardly extending lugs formed on said arms inwardly of said curved portions, and resilient grips carried by said lugs, as and for the purpose described.

2. In a hat pin guard, the combination with a hat pin having an annular groove therein inwardly of its pointed end, of a hat pin guard comprising a sectional head having a seat therein, a spring member mounted in said seat, said spring member comprising a plate bent upon itself to form spring arms, the outer ends of said arms being curved to coöperate to form a bore, grips carried by said arms inwardly of said curved portions, a yieldable buffer carried by the medial portion of said plate, said bore being adapted to receive the point of said pin and said grips engaging in said annular groove, as and for the purpose described.

In testimony whereof I hereunto affix my signature in the presence of two witnesses.

ARCHIBALD L. BURGER.

Witnesses:
C. N. SCANLON,
R. E. RICHTER.

Copies of this patent may be obtained for five cents each, by addressing the "Commissioner of Patents, Washington, D. C."